United States Patent [19]
Jenness

[11] Patent Number: 4,673,986
[45] Date of Patent: Jun. 16, 1987

[54] IMAGE DISTORTION CORRECTION METHOD AND APPARATUS

[75] Inventor: Timothy A. Jenness, Portland, Oreg.

[73] Assignee: Tektronix, Inc., Beaverton, Oreg.

[21] Appl. No.: 794,334

[22] Filed: Nov. 4, 1985

Related U.S. Application Data

[63] Continuation of Ser. No. 443,820, Nov. 23, 1982, abandoned.

[51] Int. Cl.$^4$ ............................................. H04N 5/68
[52] U.S. Cl. ...................................... 358/242; 358/64; 315/370; 315/382
[58] Field of Search ............... 358/242, 243, 222, 218, 358/64, 65; 315/370, 371, 382

[56] References Cited

U.S. PATENT DOCUMENTS

| | | | |
|---|---|---|---|
| 3,440,483 | 4/1969 | Kaashoek | 315/370 |
| 3,740,608 | 5/1973 | Manber | 315/370 |
| 3,893,174 | 7/1975 | Sano | 358/65 |
| 3,944,737 | 3/1976 | Drax | 315/370 |
| 4,251,754 | 2/1981 | Navarro | 315/370 |
| 4,287,506 | 9/1981 | Richards | 315/370 |
| 4,298,944 | 11/1981 | Stoub | 315/370 |
| 4,352,047 | 9/1982 | Imayasu | 315/370 |
| 4,459,614 | 7/1984 | Holzgrafe | 358/222 |

Primary Examiner—Tommy P. Chin
Attorney, Agent, or Firm—John H. Bouchard; Francis I. Gray; John Smith-Hill

[57] ABSTRACT

A method for compensating for video image distortion on a cathode ray tube (CRT) is accomplished by determining the distortion occurring along one axis of deflection of the CRT electron beam. The distortion is determined by predicting the position of the electron beam during a particular scan along the axis of deflection. The rate at which video image information is displayed (pixel rate) via the electron beam is varied according to the predicted position of the electron beam during the scan along the axis.

17 Claims, 22 Drawing Figures

S-DISTORTION
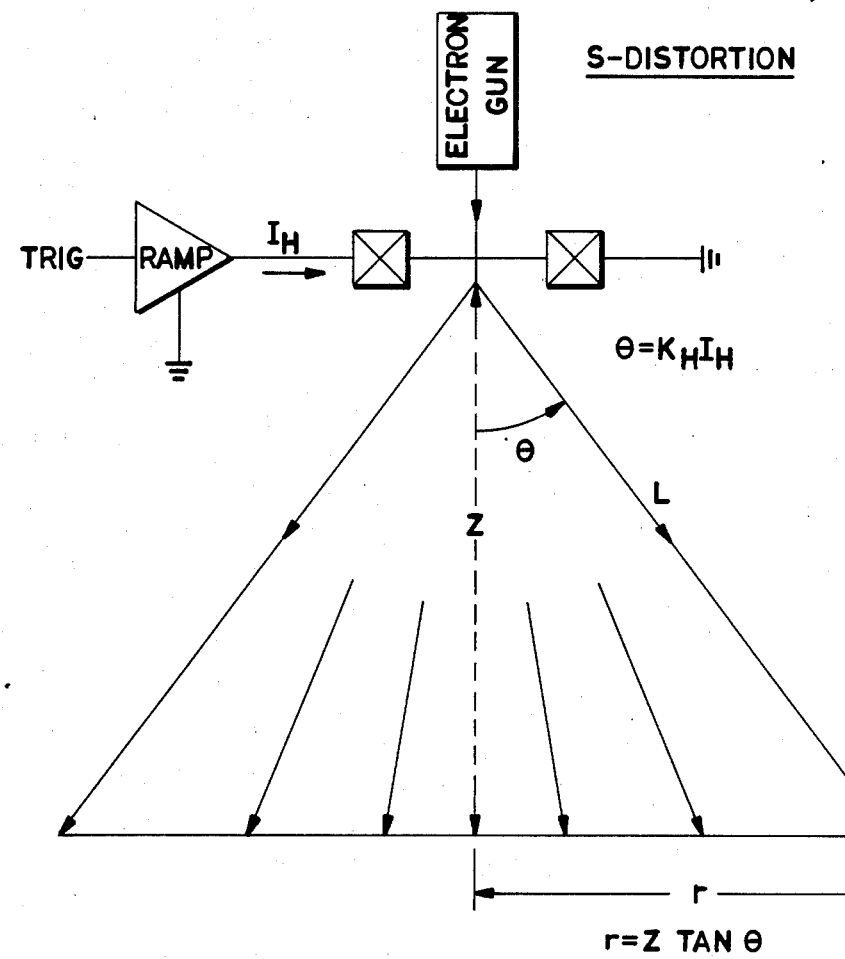
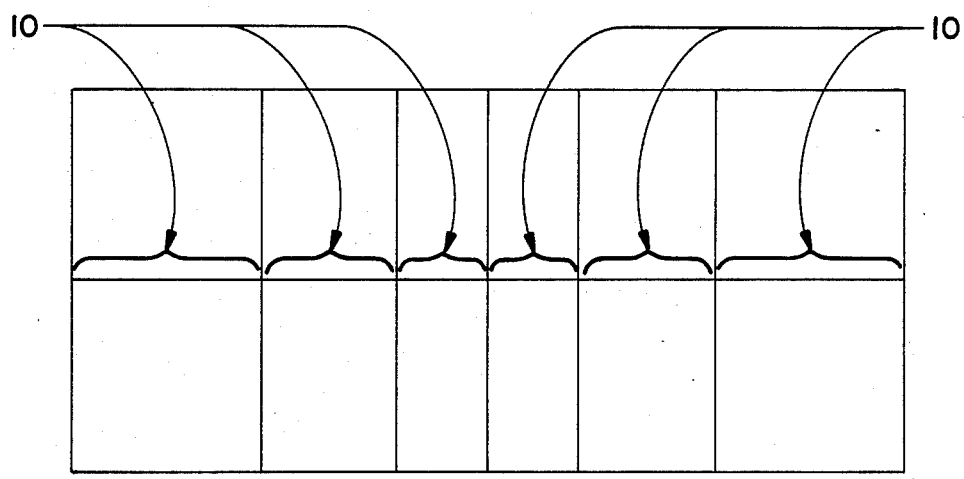
Fig_1.
(PRIOR ART)

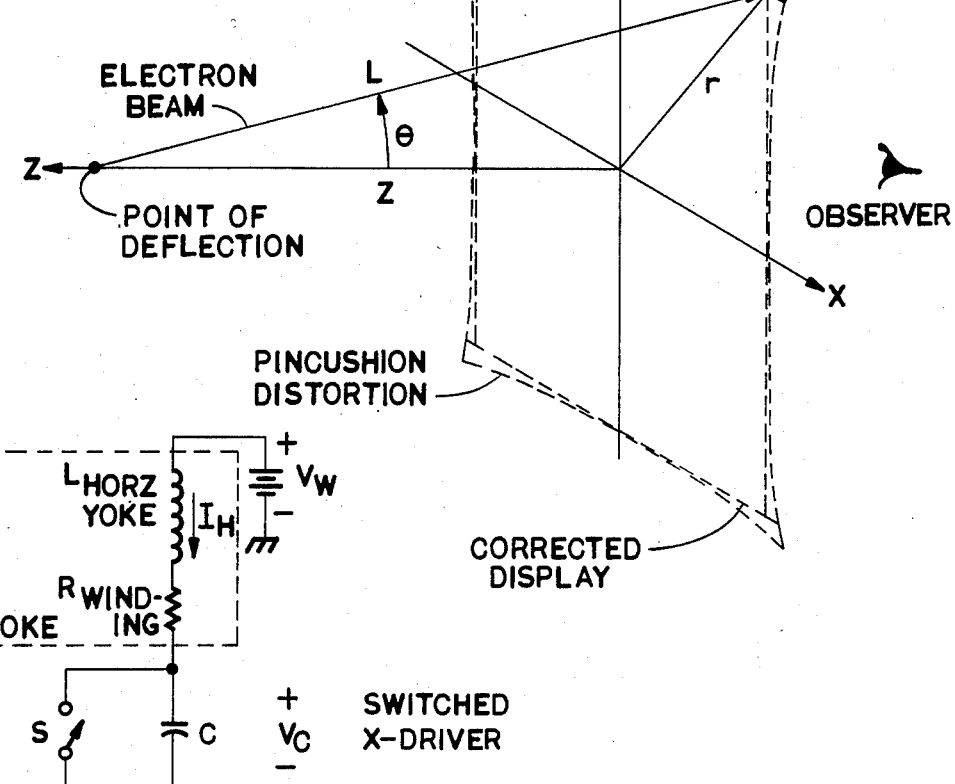
Fig. 2.
(PRIOR ART)
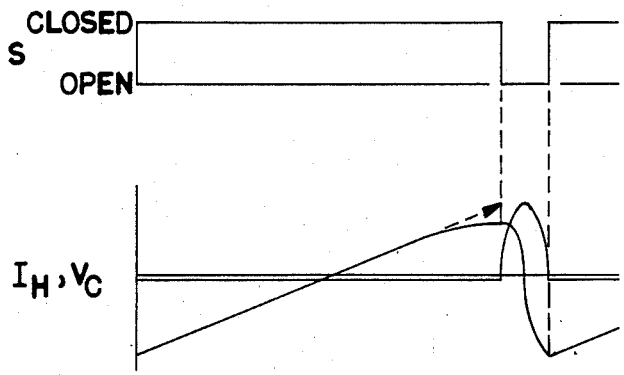
Fig. 3A(1).
(PRIOR ART)
Fig. 3A(2).
(PRIOR ART)
Fig. 3A(3).
(PRIOR ART)

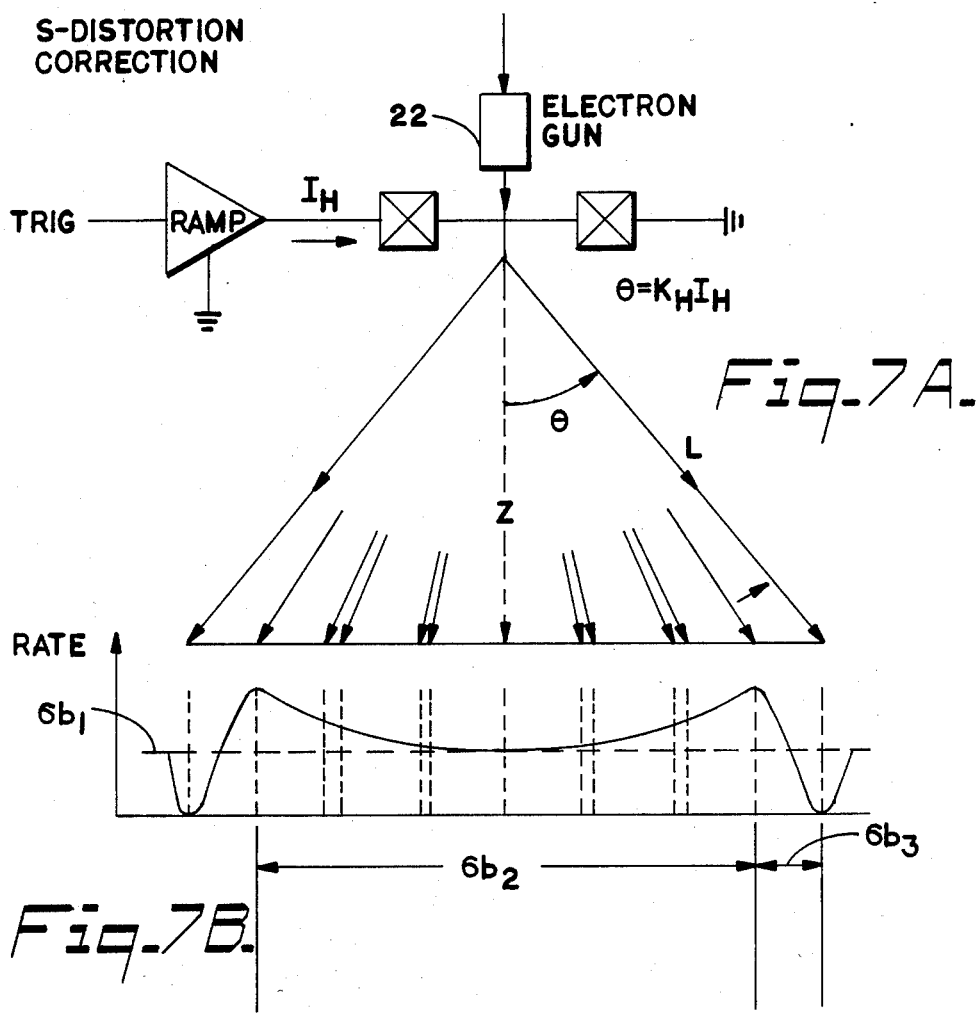
Fig. 7A.
Fig. 7B.
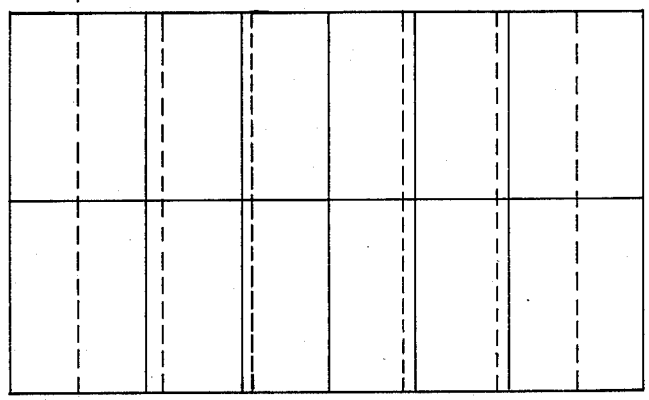
Fig. 7C.

HORIZONTAL LINEARITY DISTORTION CORRECTION

ANODE LOADING CORRECTION

IMAGE DISTORTION CORRECTION METHOD AND APPARATUS

This is a continuation of application Ser. No. 443,820 filed Nov. 23, 1982 and now abandoned.

BACKGROUND OF THE INVENTION

1. Field of the Invention

The subject matter of the present invention pertains to an image distortion correction apparatus and to techniques for compensating for various types of image distortion appearing on a display.

2. Description of the Prior Art

When an electron beam scans across an inner face plate of a Cathode Ray Tube (CRT), while transferring video image information thereto, for display thereon, various types of video image distortion of the video image displayed on the CRT are produced. For example, as shown in FIG. 1, if the electron beam transfers the video image information to the CRT intermittently, at equally spaced intervals of time, during the scan thereof across said inner faceplate of said CRT, the video image information will be displayed thereon at non-equally spaced intervals of length or distance. Non-equally spaced intervals of length 10 are illustrated in FIG. 1. This type of distortion is called S-distortion. In three dimensions, the S-distortion of FIG. 1 takes a different form. This different form of distortion is called pin cushion distortion, illustrated in FIG. 2. U.S. Pat. No. 4,039,899, to Battjes et al., filed May 3, 1976 which describes the pin cushion distortion phenomenon. Another form of distortion is called horizontal linearity distortion, illustrated in FIGS. 3a and 3b. A DC voltage applied to a deflection yoke of the CRT tends to create a ramp current flowing therethrough. However, an inherent winding resistance, in series with the yoke, distorts the ramp current flowing therethrough, such that a distorted version thereof, as illustrated in FIG. 3a(3), is the result. The distorted ramp current, illustrated in FIG. 3a (3), distorts the video image information displayed on the CRT. The distorted video image, of this type, displayed on the CRT, is illustrated in FIG. 3b of the drawings.

A still further type of video image distortion is called anode loading, illustrated with reference to FIG. 4 of the drawings. When the anode supply voltage of the CRT is successively loaded (i.e. large beam currents), the anode voltage drops. The deflection sensitivity of said electron beam increases as a result thereof. Consequently, electron beam overscan is the result. This overscan is illustrated in the solid filled panel of FIG. 4.

U.S. Pat. No. 4,039,899, referred to hereinabove, attempts to compensate for these distortions by predistorting a deflection signal by an amount necessary to provide an undistorted display. For example, in FIG. 5a, a horizontal and vertical ramp signal, generated by horizontal and vertical ramp signal generators, energize the X and Y inputs of a geometry circuit. A typical geometry circuit is illustrated in U.S. Pat. No. 4,039,899, referred to above, the disclosure of which is incorporated herein by reference. The geometry circuit pre-distorts the horizontal and vertical ramp signals by an amount necessary to compensate for the above-mentioned distortions. A pre-distorted corrected X-output signal and a pre-distorted corrected Y-output signal is generated therefrom for energizing via power amplifiers P an X-deflection coil and a Y-deflection coil, respectively, attached to the CRT. Since the horizontal and vertical ramp signals are pre-distorted prior to energization of the respective X and Y deflection coils, the above-mentioned distortions have been compensated therefor. The prior art also includes a switched X-axis drive of approximated predistortion via magnets, width coil, saturable reactor, and S-capacitor ($C_s$), as seen in FIG. 5b.

However, a less costly, alternative method and apparatus is required to compensate for all of the above-mentioned types of video image information distortion.

SUMMARY OF THE INVENTION

It is a primary object of the present invention to provide an alternative, less costly apparatus and method of compensating for said video image distortion.

It is a further object of the present invention to provide an alternative, less costly apparatus and method of compensating for said video image distortion by varying the rate at which said video image information is transferred to said inner faceplate of said CRT for display thereon during the scan of said electron beam thereacross, said rate varying in accordance with the distortion being compensated therefor.

It is still another object of the present invention to extend the method of the present invention, of compensating for said video image distortion, to color CRT's and to provide another apparatus for compensating for said video image distortion in said color CRT's.

These and other objects of the present invention are accomplished by determining the distortion occurring along one axis of deflection of said electron beam. The distortion is determined by predicting the position of said electron beam, during the scan thereof, along said one axis. The rate at which said video image information is transferred to said inner faceplate of said CRT, via the scan of the electron beam, is varied in accordance with the predicted position of said electron beam along said one axis during the scan thereof.

Further scope of applicability of the present invention will become apparent from the description given hereinafter. However, it should be understood that the details of the description and the specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

A full understanding of the present invention will be obtained from the detailed description given hereinbelow and the accompanying drawings which are given by way of illustration only, and thus are not limitative of the present invention, and wherein:

FIG. 1 illustrates S-Distortion.

FIG. 2 illustrates pincushion distortion.

FIGS. 7a to 7c illustrate the S-distortion of FIG. 1, however, the rate at which the video image information is transferred to the CRT via the electron beam is varied in accordance with the S-distortion, whereby the distortion has been compensated therefor.

DETAILED DESCRIPTION OF THE PREFERRED EMBODIMENT

Figure 6:
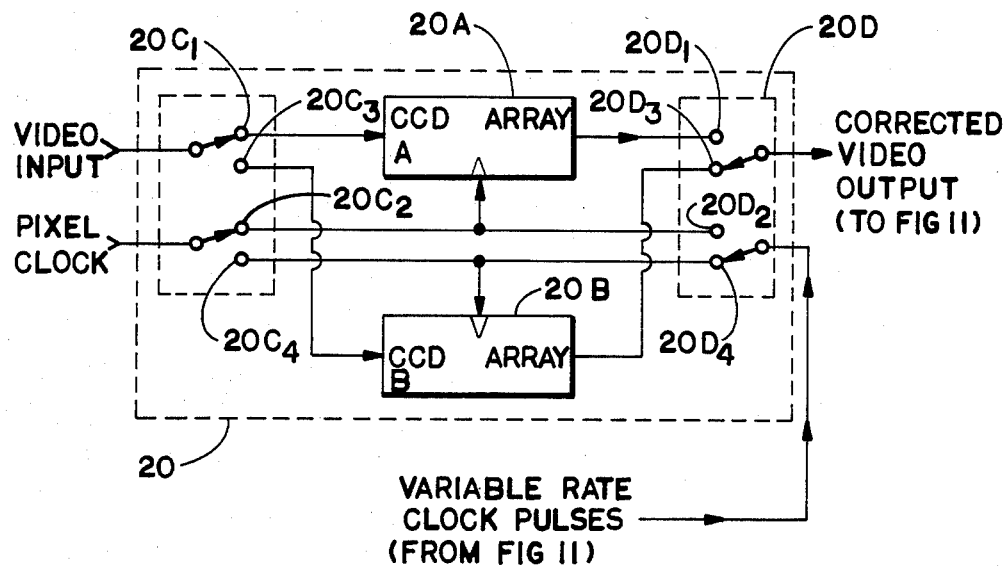
FIG. 6 illustrates an apparatus according to the present invention for developing a corrected video output in response to a video input and a variable rate clock pulse input, the frequency of said determining the rate at which the video image information is transferred to the inner faceplate of said CRT via the scan of said electron beam.

Referring to FIG. 6, an apparatus 20 for developing a corrected video output in response to a video input and a variable rate clock pulse input is illustrated. A CRT display comprises a plurality of mutually parallel raster lines, each of said raster lines comprising a plurality of picture elements (pixels). A video signal and a pixel clock signal are applied to said apparatus, the video signal comprising a plurality of individual samples of video information corresponding to the plurality of pixels associated with each raster line of the CRT display. The pixel clock signal comprises a plurality of pulses corresponding to said plurality of pixels. Said apparatus 20 comprises a first array of elements 20A (otherwise known as a CCD array A), and a second arry of elements 20B (known as a CCD arry B) double-buffered with respect to said first array of elements. The apparatus 20 further comprises a first pair of switches 20C and a second pair of switches 20D. Said first pair of switches 20C includes a first switch, a second switch, a first switch terminal 20C1 and a second switch terminal 20C2, the first switch terminal 20C1 being connected to said first array of elements 20A for storing the samples of video information therein when said terminal 20C1 receives said information, the second switch terminal 20C2 being connected to a clock terminal of said first array of elements for energizing said terminal with said pulses comprising said pixel clock when said terminal 20C2 receives said pulses. Said first pair of switches 20C further include a third switch terminal 20C3 and a fourth switch terminal, the third switch terminal 20C3 being connected to said second array of elements 20B for storage of the samples of video information therein when said terminal 20C3 receives said information, the fourth switch terminal 20C4 being connected to a clock terminal of said second array of elements for energizing said clock terminal with said pulses comprising said pixel clock when said terminal 20C4 receives said pulses.

The second pair of switches 20D includes a first switch, a second switch, a first switch terminal 20D1 and a second switch terminal 20D2. The first switch terminal 20D1 is adapted to receive the samples of video information from the first array of elements 20A and develops a corrected video output signal therefrom in response thereto when said first switch is connected to said first switch terminal 20D1. The second switch terminal 20D2 is adapted to receive a plurality of variable rate clock pulses when said second switch is connected to the second switch terminal 20D2, the variable rate clock pulses energizing the clock terminal of said first array of elements 20A, the samples of video information being received at said first switch terminal 20D1 at a rate corresponding to the frequency of said variable rate clock pulses energizing said clock terminal thereof.

The second pair of switches 20D further include a third switch terminal 20D3 and a fourth switch terminal 20D4. The third switch terminal 20D3 is adapted to receive the samples of video information from the second array of elements 20B and develops said corrected video output therefrom in response thereto when said first switch is connected to said third switch terminal 20D3. The fourth switch terminal 20D4 is adapted to receive the plurality of variable rate clock pulses when said second switch is connected to the fourth switch terminal 20D4, the pulses energizing the clock terminal of said second array of elements 20B, the samples of video information stored therein being received at said third switch terminal 20D3 at a rate corresponding to the frequency of said variable rate clock pulses energizing said clock terminal of said second array of elements 20B.

The operation of the apparatus of FIG. 6 will be described in the paragraphs hereinbelow. In FIG. 6, when the first and second switches associated with the first pair of switches 20C are connected to the first and second switch terminals 20C1 and 20C2, video information is stored in the first array of elements 20A at a rate corresponding to the rate at which the pulses corresponding to the pixel clock energize the clock terminal thereof.

Video information has already been stored in the second array of elements 20B. The first and second switches associated with the second pair of switches 20D are connected to the third and fourth switch terminals 20D3 and 20D4 thereof, the video information stored in the second array of elements 20B being read-out of the second array at a rate corresponding to the rate at which the pulses corresponding to the variable rate clock pulses energize the clock terminal of the second array 20B.

The first and second switches associated with first pair of switches 20C are switched to the third and fourth switch terminals 20C3 and 20C4, and the first and second switches associated with the second pair of switches 20D are switched to the first and second switch terminals 20D1 and 20D2. The incoming video information is stored in the second array of elements 20B at a rate defined by the frequency of the pulses corresponding to the pixel clock pulses, and the previously stored video information is read out from the first array of elements at the rate defined by the frequency of the variable rate clock pulses.

As a result of the functional operation of the apparatus 20 shown in FIG. 6, the video information, in the form of said corrected video output, is generated from apparatus 20 at a selectively variable rate, the rate being dependent upon the frequency of the variable rate clock pulses energizing the clock terminals of the first and second arrays of elements 20A and 20B. The frequency of the variable rate clock pulses is further dependent upon the position of the electron beam, during its scan thereof along one axis, across the inner faceplate of the CRT. The position of the electron beam is further dependent upon the type of video image distortion causing distortion of the image displayed on the CRT.

In order to illustrate the superior results achieved by virtue of the invention disclosed herein, relative to the prior art illustrated in FIGS. 1-4, reference is directed to FIGS. 7-10 of the drawings. In FIG. 7, the S-distortion is illustrated, as in FIG. 1. However, the rate at which the video information is read from the arrays of elements 20A and 20B associated with the apparatus 20 of FIG. 6, for energizing the electron guns of the CRT, is varied in accordance with this type of video image distortion. In FIG. 7a, the sweep of the electron beam within the CRT is illustrated. However, as indicated in FIG. 7b, the rate at which the video information is developed from apparatus 20 for energizing the electron guns of the CRT varies depending upon the position of the electron beam when undergoing the scan thereof. In FIG. 7c, the solid lines represent the distorted video image as displayed on the CRT, the image being distorted as a result of said S-distortion as in FIG. 1. However, the dotted lines represent the undistorted video image, as displayed on the CRT, the video image being undistorted as a result of the novel apparatus and method according to the present invention, whereby image information is transferred to the CRT display at a selectively variable rate dependent upon the type of distortion being compensated for.

Figure 8:
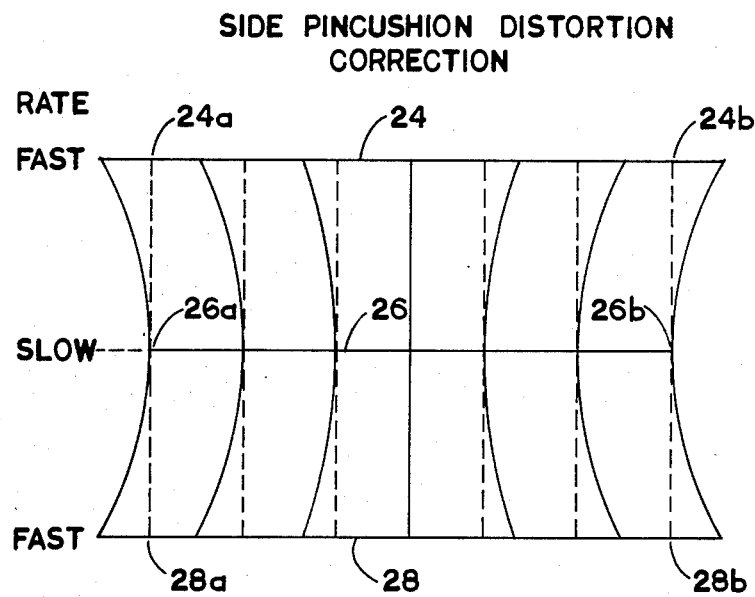
FIG. 8 illustrates the side pincushion distortion of FIG. 2, however, said rate is varied line to line in accordance with said pincushion distortion and the distortion is illustrated as being compensated therefor.

In FIG. 8, the side pincushion distortion of FIG. 2 illustrated. However, since the rate at which the video information, read from apparatus 20, is varied, for energizing the electron guns of the CRT, the side pincushion distortion has been compensated for. The solid lines illustrated in FIG. 8 represent the image on the CRT display having the side pincushion distortion, whereas the dotted lines represent the image on the CRT display without the side pincushion distortion. As indicated in FIG. 8, a top scan line 24 is traced by the electron beam within the CRT, the rate at which the video information is transferred to the CRT being faster than the rate at which the video information is transferred to the CRT when an intermediate scan line 26 is traced. The transfer of the video information occurs at a slower rate, when the intermediate scan line 26 is traced, than when a lowermost scan line 28 is traced. When the top scan line 24 is traced, the transfer of the video information begins at a point 24a, the transfer ending at a point 24b. When the intermediate scane line 26 is traced, the transfer of the video information begins at a point 26a, the transfer ending at a point 26b. When a lowermost scan line 28 is traced, the transfer of the video information begins at a point 28a, the transfer ending at a point 28b.

Figure 3B:
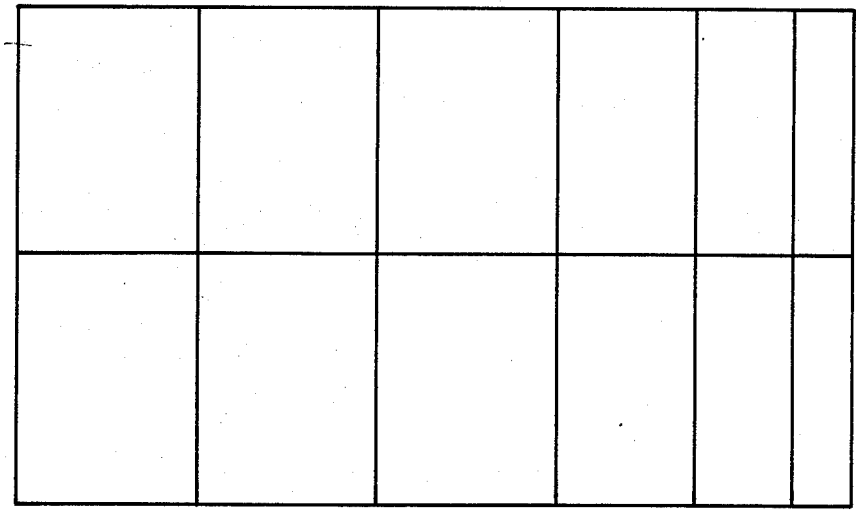
FIGS. 3a(1) to 3a(3) and 3b illustrate horizontal linearity distortion.
Figure 4:
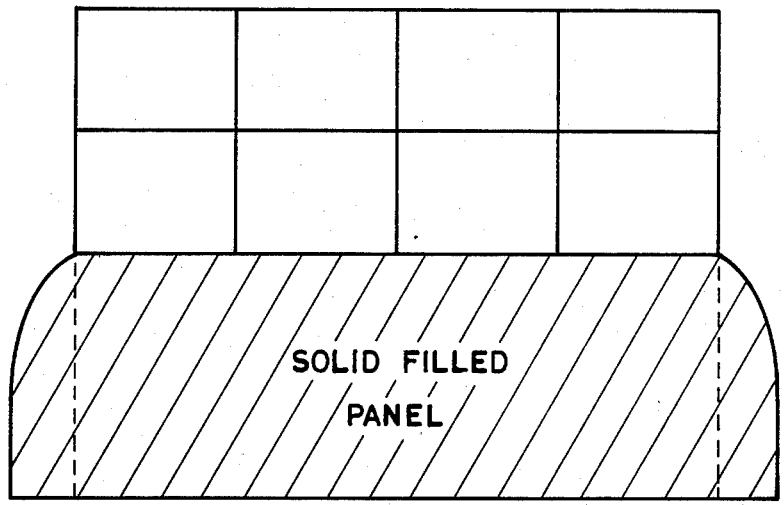
FIG. 4 illustrates anode loading distortion.
Figure 9:
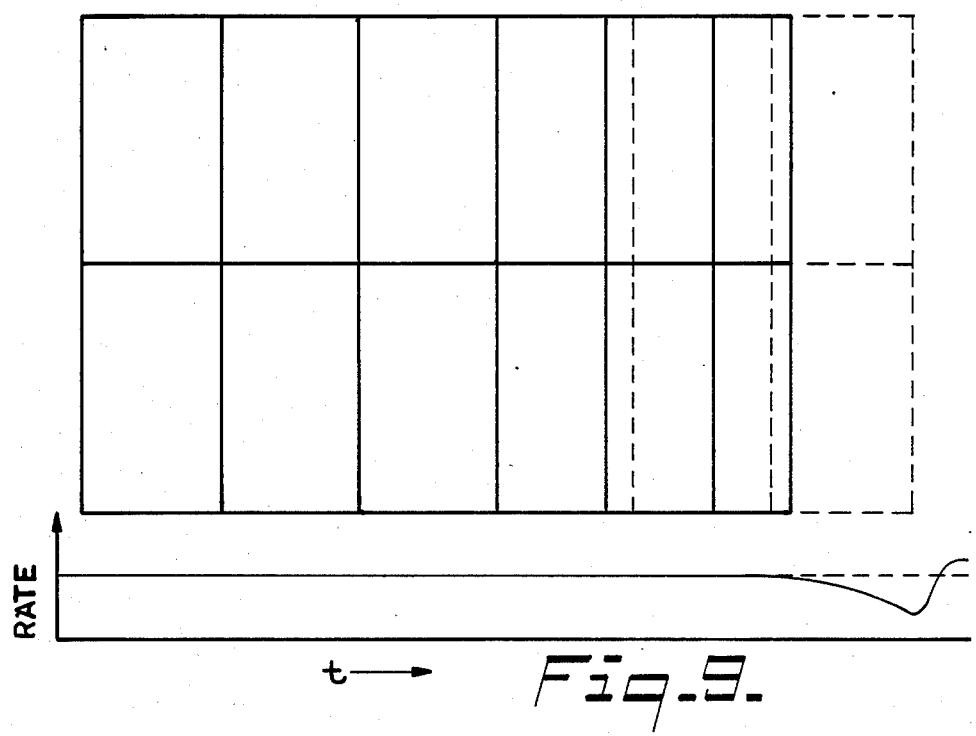
FIG. 9 illustrates the horizontal linearity distortion of FIG. 3, however said rate is varied in accordance with said horizontal linearity distortion and the distortion is illustrated as being compensated therefor.

In FIG. 9 the horizontal linearity distortion of FIGS. 3 and 4 is illustrated. However, since the rate at which the video information is read from apparatus 20 is varied, for energizing the electron guns of the CRT, the horizontal linearity distortion has been compensated for. In FIG. 9, the solid lines represent the image on the CRT display having said horizontal linearity distortion, whereas the solid lines in association with the additional dotted lines represent the image on the CRT display without said horizontal linearity distortion. Note that the rate, at which the video information is read from apparatus 20 for transfer to the CRT display, is gradually decreased as said electron beam sweeps from a point approximately midrange of the sweep to a point corresponding to an extreme right-hand portion of the sweep.

Figure 10:
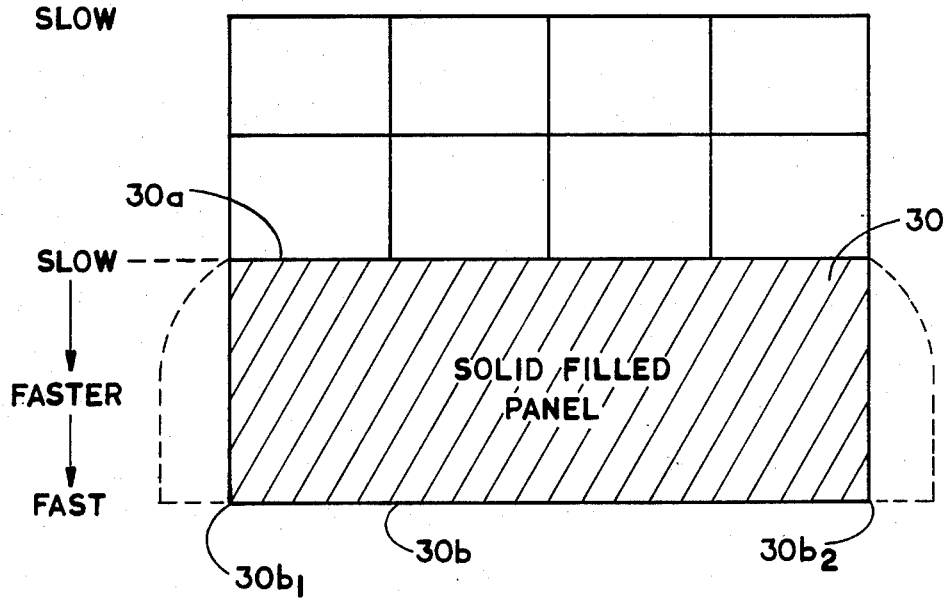
FIG. 10 illustrates the anode loading distortion of FIG. 4, however, said rate is varied in accordance with said anode loading distortion and the distortion is illustrated as being compensated therefor.

In FIG. 10, the anode loading distortion of FIG. 4 (resulting from deflection sensitivity dependency on anode voltage) is illustrated. As before, since the rate at which the video information read from apparatus 20 is varied, for energizing the electron guns of the CRT, the anode loading distortion has been compensated for. In FIG. 10, a solid filled panel area represents a bottom-half portion of the CRT display when said anode loading distortion has been compensated for by virtue of the utilization of the present invention. When the electron beam traces an intermediate scan line 30a, the video information is read out from apparatus 20 at a relatively slow rate. As FIG. 10 indicates, the video information is gradually read from apparatus 20 at a faster and still faster rate beginning with the trace of the intermediate scan line 30a, and ending with the trace of a lowermost scan line 30b. The transfer of the video information from apparatus 20 to the CRT display, via the electron guns of the CRT, begins at a left-most point 30b1, and ends at a right-most point 3b2, as the electron beam traces the scan lines disposed between the intermediate scan line 30a and the lowermost scan line 30b.

In order to fully understand the operation of the apparatus 20 shown in FIG. 6, it is necessary to further understand the method by which the variable rate clock pulses, utilized by apparatus 20, are produced.

Figure 5A:
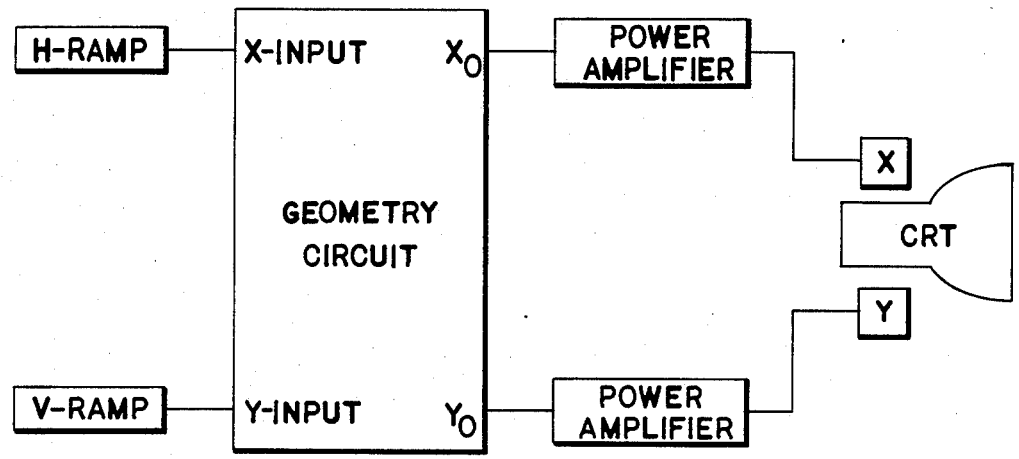
FIG. 5a illustrates a prior art apparatus for compensating for the above-mentioned types of distortion.
Figure 5B:
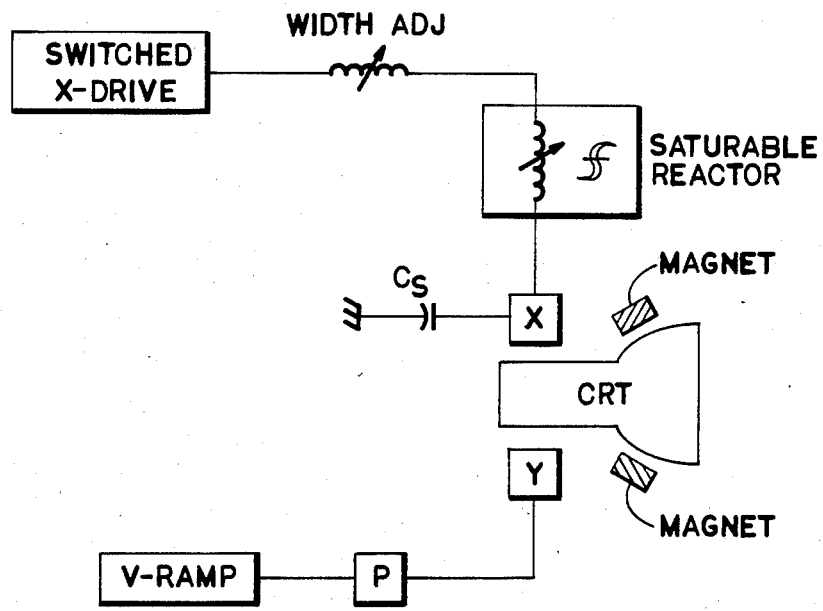
FIG. 5b illustrates prior art scan techniques used in the television industry.
Figure 11:
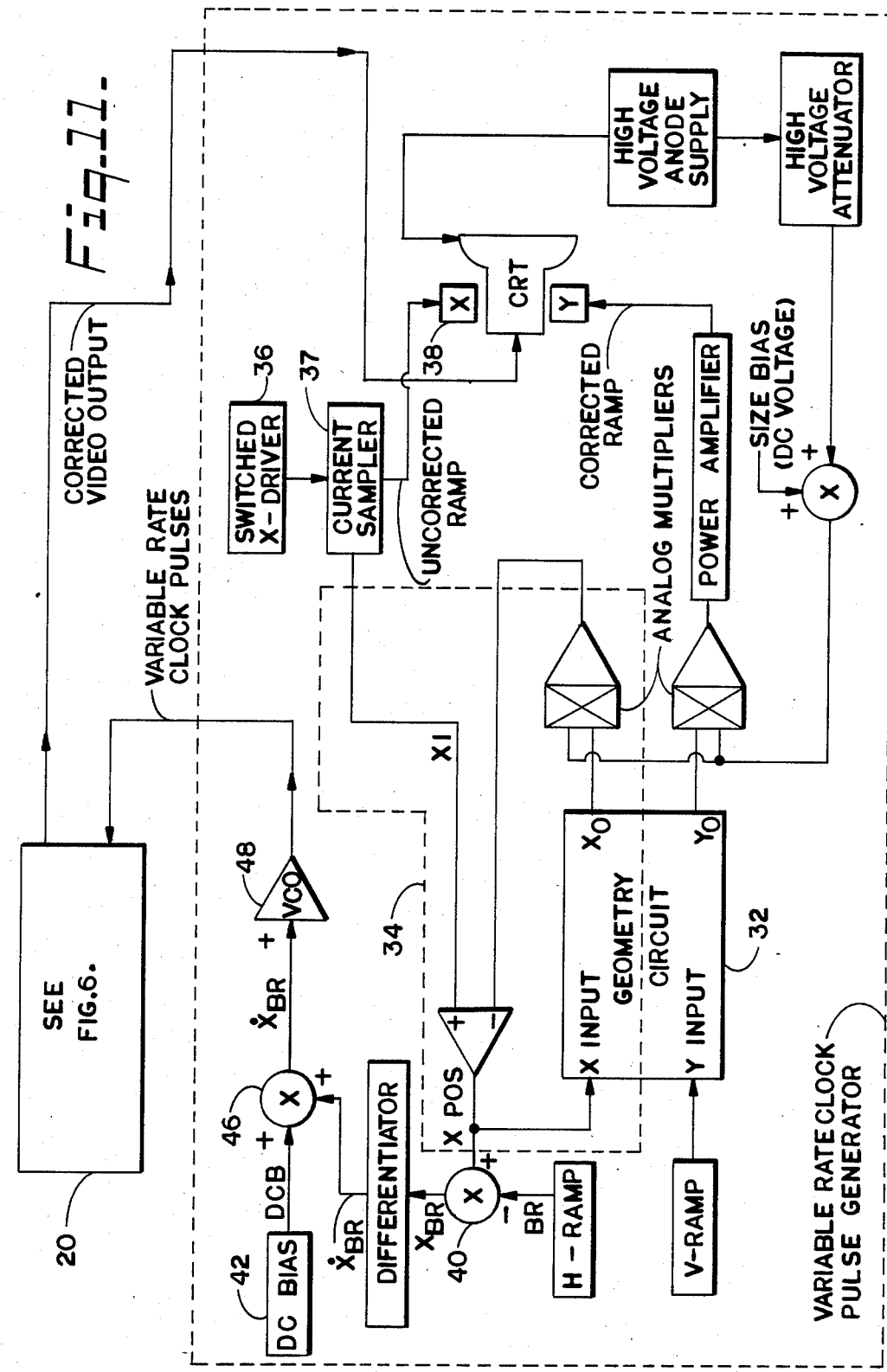
FIG. 11 illustrates an apparatus for developing said variable rate clock pulse input required for said apparatus illustrated in FIG. 6.

Referring to FIG. 11, the apparatus 20 of FIG. 6 is illustrated in conjunction with a variable rate clock pulse generator. In FIG. 11, the configuration of FIG. 5 is illustrated; however, the configuration has been modified and altered. As in FIG. 5, FIG. 11 illustrates a vertical ramp signal generator energizing a Y-input terminal of a geometry circuit 32.

A typical geometry circuit may be found in U.S. Pat. No. 4,039,899 to Battjes et al., the disclosure of which is hereby incorporated by reference.

The Y-output of the geometry circuit 32 is connected to an analog multiplier. The output of this analog multiplier produces a pre-distorted, corrected ramp signal for energizing a Y-axis deflection coil 33 of a CRT via a power amplifier. However, contrary to the FIG. 5a configuration, in FIG. 11, the X-input and the X-output of the geometry circuit 32 lie within a feedback loop of an operational amplifier 34. The X-output of the geometry circuit is connected to the negative input terminal of the operational amplifier, via analog multiplier. The X-input of said geometry circuit is connected to an output terminal of said operational amplifier 34.

One input terminal of both said analog multipliers receives a voltage proportional to the anode supply voltage of the CRT. The voltage present at the output terminal of said analog multipliers represent predistorted, corrected functions designed to compensate for all of the various types of video image distortions illustrated with reference to FIGS. 1-5.

Figure 12:
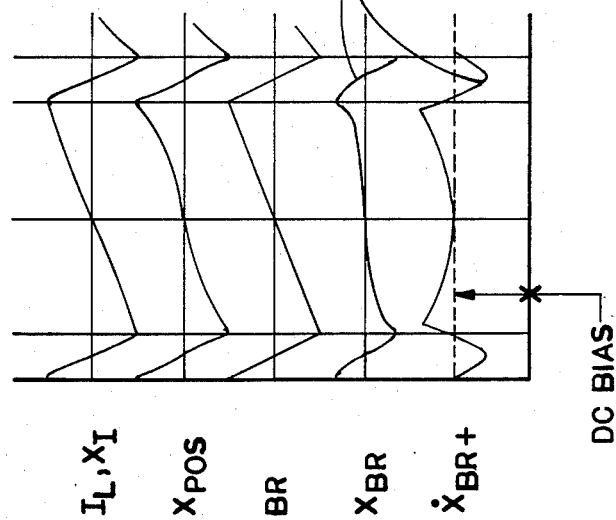
FIG. 12 illustrates a plurality of waveforms associated with the apparatus of FIG. 11.

A switched X-driver 36 produces an un-predistorted, uncorrected ramp signal. The X-driver is connected to an X-axis deflection coil 38 of said CRT, the unpredistorted, uncorrected ramp signal energizing said X-axis deflection coil 38. A ramp signal current $I_L$ corresponding to said unpredistorted uncorrected ramp signal, is sensed in said coil 38, the voltage corresponding thereto deflecting the electron beam, horizontally. The ramp signal current $I_L$ corresponding to the un-predistorted ramp signal energizing said coil 38, is converted to a corresponding ramp signal voltage $X_I$. The ramp signal voltage $X_I$ energizes the positive input terminal of the operational amplifier 34. A signal "Xpos" appears at the output terminal of operational amplifier 34. The signal waveforms corresponding to signals $I_L$, $X_I$ and Xpos are illustrated in FIG. 12 of the drawings.

The operational amplifier 34 is connected in a unique way for a particular purpose. The signal voltage $X_I$ energizing the positive input terminal of said amplifier 34, represents an un-predistorted linear function, the signal voltage $X_I$ deflecting the electron beam horizontally within the CRT. The geometry circuit 32 and analog multiplier in the feedback loop of the operational amplifier 34 generally represent a non-linear signal generating circuit, the non-linear signal generated by the geometry circuit and analog multiplier being a pre-distorted, non-linear function, the non-linear signal energizing the negative input terminal of the operational amplifier 34.

It may be shown that an operational amplifier, configured in the above manner, (wherein a non-linear signal generating circuit is positioned in the feedback loop thereof and energizes one input terminal thereof and a linear signal energizes another input terminal thereof) develops a "position predictable" signal at the output terminal thereof.

In the context of FIG. 11, the signal "Xpos" represents the "position predictable" signal. The amplitude of signal "Xpos" represents the position of the electron beam during its deflection thereof as measured along the X axis of the CRT. Therefore, the signal "Xpos" represents an X-axis "position predictable" signal, in that the position of the electron beam, as it is deflected along the X-axis thereof, is predictable.

In order to normalize active and blanking pixel rates to the scanning and retrace times, respectively, it is necessary to process the signals in terms of positional and velocity error.

The output terminal of the operational amplifier 34 is connected to a summer 40. A horizontal ramp signal generator 42 is also connected to the summer 40, and generates a ramp signal BR, as shown in FIG. 12. The ramp signal BR, represents the ideal position of the electron beam along the X-axis. The summer 40 subtracts ramp signal BR from signal Xpos, yielding signal $X_{BR}$. Signal $X_{BR}$ is shown in FIG. 12. Since signal Xpos represents the predictable position of the electron beam, along the horizontal axis (X axis) on the CRT, and since signal BR is an ideal representation of the electron beam position along the X-axis, signal $X_{BR}$ represents the positional error of the electron beam along the X-axis thereof.

The output of summer 40 is connected to a differentiator 44; therefore, signal $X_{BR}$ energizes said differentiator. The differentiator 44 differentiates signal $X_{BR}$ with respect to time, yielding a differentiated signal $\dot{X}_{BR}$.

Since signal $X_{BR}$ represents the positional error of the electron beam within the CRT along the X-axis thereof, the differentiated signal $\dot{X}_{BR}$ represents the velocity or rate error at which the electron beam sweeps from left to right, across the CRT, along the X-axis thereof. Alternatively, signal $\dot{X}_{BR}$ may be viewed as representing the error in screen velocity of the electron beam as it sweeps along the X-axis thereof.

A summer 46 is connected to the output of the differentiator 44, and to the D.C. bias source 42 for adding a D.C. offset signal (DCB) to the differentiated signal $\dot{X}_{BR}$ yielding signal $\dot{X}_{BR+}$. Signal $\dot{X}_{BR+}$ is a function of signal $\dot{X}_{BR}$ offset by the signal DCB and is therefore representative of the normalized velocity or rate at which the electron beam sweeps from left to right (active), and right to left (blanking) across the CRT, along the X-axis thereof. Signals $X_{BR}$ and $\dot{X}_{BR+}$ are illustrated in FIG. 12 of the drawings.

Signal $\dot{X}_{BR+}$ energizes an input terminal of a voltage controlled oscillator 48, the oscillator 48 generating the variable rate clock pulses, the frequency of said pulses varying in accordance with the voltage of signal $\dot{X}_{BR+}$ energizing the input terminal thereof. The variable rate clock pulses are applied to the switch terminals (20D2 or 20D4) associated with the second pair of switches 20D of apparatus 20 shown in FIGS. 6 and 11.

The operation of the Image Distortion Correction apparatus shown in FIG. 11 is described in detail in the paragraphs hereinbelow.

Assume that the switched position of the first and second pairs of switches 20C and 20D are as illustrated in FIG. 6 of the drawings.

The image displayed on the CRT is generated as a result of the electron beam tracing a plurality of scan lines on the CRT to form a frame of video information, a multitude of frames of video information constituting said image being displayed on the CRT.

A scan line of video information is stored in the first array of elements 20A, via switch terminal 20C1, at a rate which is determined by the frequency of the pixel clock pulses energizing the clock terminal thereof. Each pixel clock pulse corresponds to one pixel on one scan line traced across the inner faceplate of the CRT. An immediately previous scan line of video information is stored in the second array of elements 20B. The video information stored in the second array of elements 20B is read therefrom via switch terminal 20D3 at a rate determined by the frequency of the variable rate clock pulses energizing the clock terminal thereof.

The frequency of the variable rate clock pulses is determined as follows, with reference to FIGS. 11 and 12 of the drawings.

The X-driver 36 develops an uncorrected, unpredistorted ramp current waveform which energizes the current sampler 37 and X deflection coil 38, attached to the CRT. A corresponding uncorrected, unpredstorted ramp signal voltage, $X_I$, is developed in response thereto, the ramp signal voltage energizing the positive input terminal of operational amplifier 34. A predistorted, corrected voltage, developed at the X-output terminal of geometry circuit 32, energizes the analog multiplier connected thereto. An output signal generated therefrom energizes the negative input terminal thereof. In response thereto, the operational amplifier 34 develops a position predictable signal (Xpos) at the output terminal thereof. Summer 40 subtracts a ramp signal (BR) from the position predictable signal (Xpos). The resultant signal ($X_{BR}$) is representative of the position error of the electron beam as it sweeps from left to right along the X axis of the CRT display. The differentiator 44 differentiates signal ($X_{BR}$), yielding the differentiated signal ($\dot{X}_{BR}$), in order to determine the rate (i.e. velocity) error of the electron beam at each point in time as it sweeps along the horizontal X axis of the CRT. Summer 46 adds DC Bias (DCB) to the differentiated signal ($\dot{X}_{BR}$) to yield signal ($\dot{X}_{BR+}$), which is representative of the normalized (active and blanking) rate. A voltage controlled oscillator 48, responsive to signal ($\dot{X}_{BR+}$), develops said variable rate clock pulses, the frequency of which varies in accordance with the voltage magnitude of said signal ($\dot{X}_{BR+}$).

As the variable rate clock pulses energize the clock terminal of the second array 20B, a plurality of samples of video information stored therein are read therefrom at a rate determined by the frequency of said variable rate clock pulses. Said plurality of samples energize the electron guns within the CRT at said rate, transferring said video information to the CRT display at said rate while the electron beam is sweeping across the inner faceplate of the CRT.

In summary, the apparatus shown in FIG. 11, inclusive of the variable rate clock pulse generator and the apparatus 20, operates in the following manner: as the linear velocity of the electron beam increases during its sweep along the horizontal, X axis thereof, said rate at which the plurality of samples are read from the second array of elements increases. As a result, the video information is transferred to the CRT display at a faster rate as a result thereof. Similarly, as said linear velocity decreases, said rate also decreases proportionately.

When the video information stored in the second array of elements is completely read therefrom, the first and second pairs of switches 20C and 20D switch to their alternate switched positions, (20C3, 20C4; 20D1, 20D2). The video information is read from the first array of elements 20A and video information is stored in the second array of elements 20B, in the manner hereinbefore described in the above paragraphs. The above-mentioned functional operation of the present invention repeats once again.

Figure 13:
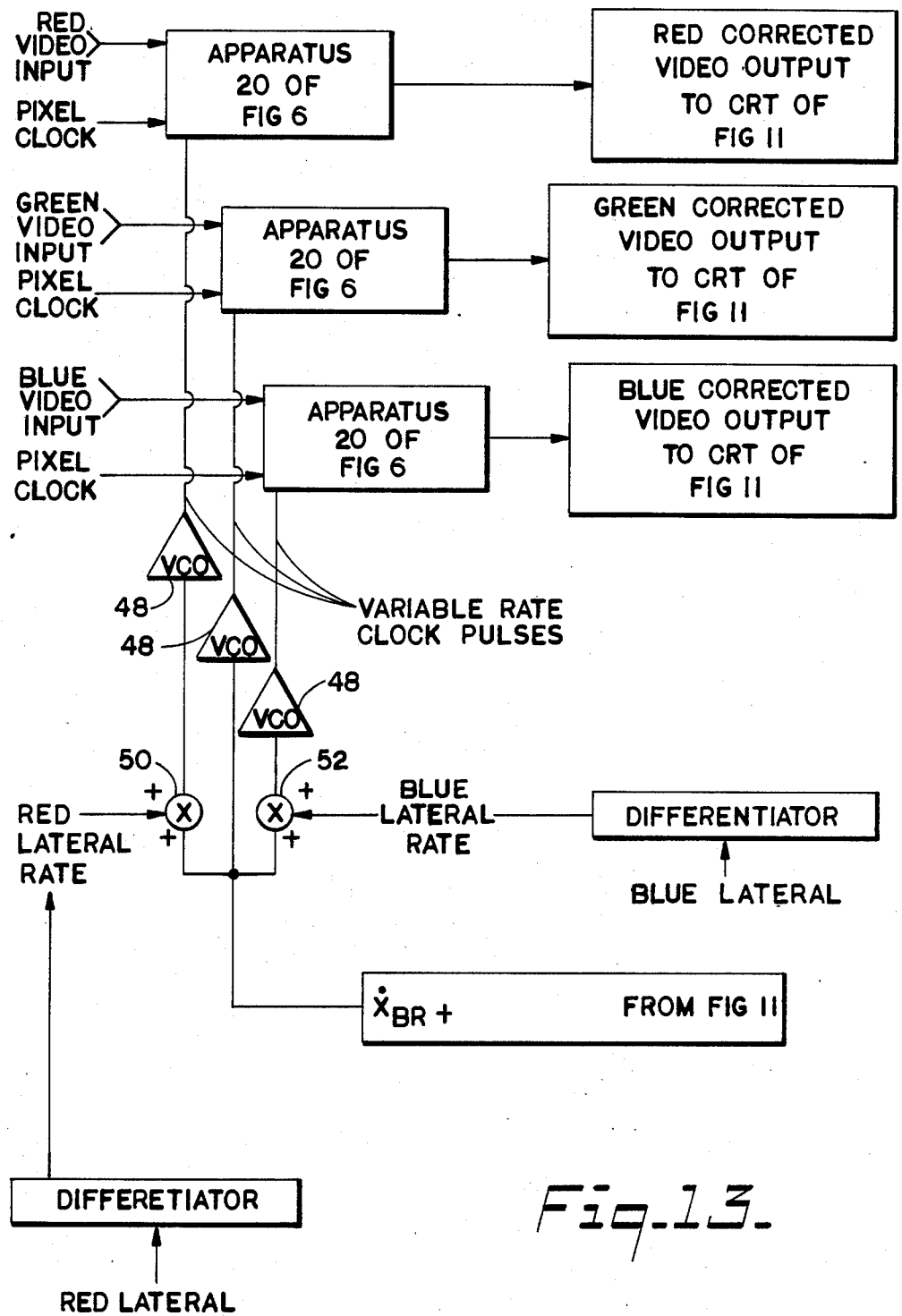
FIG. 13 illustrates a plurality of said apparatus of FIG. 6 for developing a plurality of corrected video outputs in response thereto for use in a conjunction with a color cathode ray tube.

Referring to FIG. 13, the image distortion correction method and apparatus of the present invention is utilized in conjunction with a color CRT. In lieu of one apparatus 20, as shown in FIG. 6, three such apparatus are shown, one corresponding to the red electron gun within the CRT, another corresponding to the green electron gun, and another corresponding to the blue electron gun within the CRT. The same inputs to the apparatus are shown, i.e., the pixel clock input, the video input (Red, Green, and Blue video input), and the variable rate clock pulses, as specifically discussed in the paragraphs hereinabove with reference to FIGS. 6 and 11.

The signal $X_{BR+}$, output from summer 46 of FIG. 11, is input to two summers 50, 52, and to a voltage controlled oscillator 48. A red-lateral rate signal is input to summer 50. The purpose of a red lateral signal is to achieve convergence of the red and green electron beams within the CRT by moving the red beam in line with the green beam. The red lateral signal has been differentiated to achieve the red-lateral rate signal input to summer 50. A blue-lateral rate signal is input to summer 52. The purpose of a blue lateral signal is to achieve convergence of the blue and green beams by moving the blue beam in line with the green beam. The blue lateral signal has been differentiated to achieve the blue lateral rate signal input to summer 52. The function of the system shown in FIG. 13 is substantially the same as the function of FIG. 11 described above.

Figure 14:
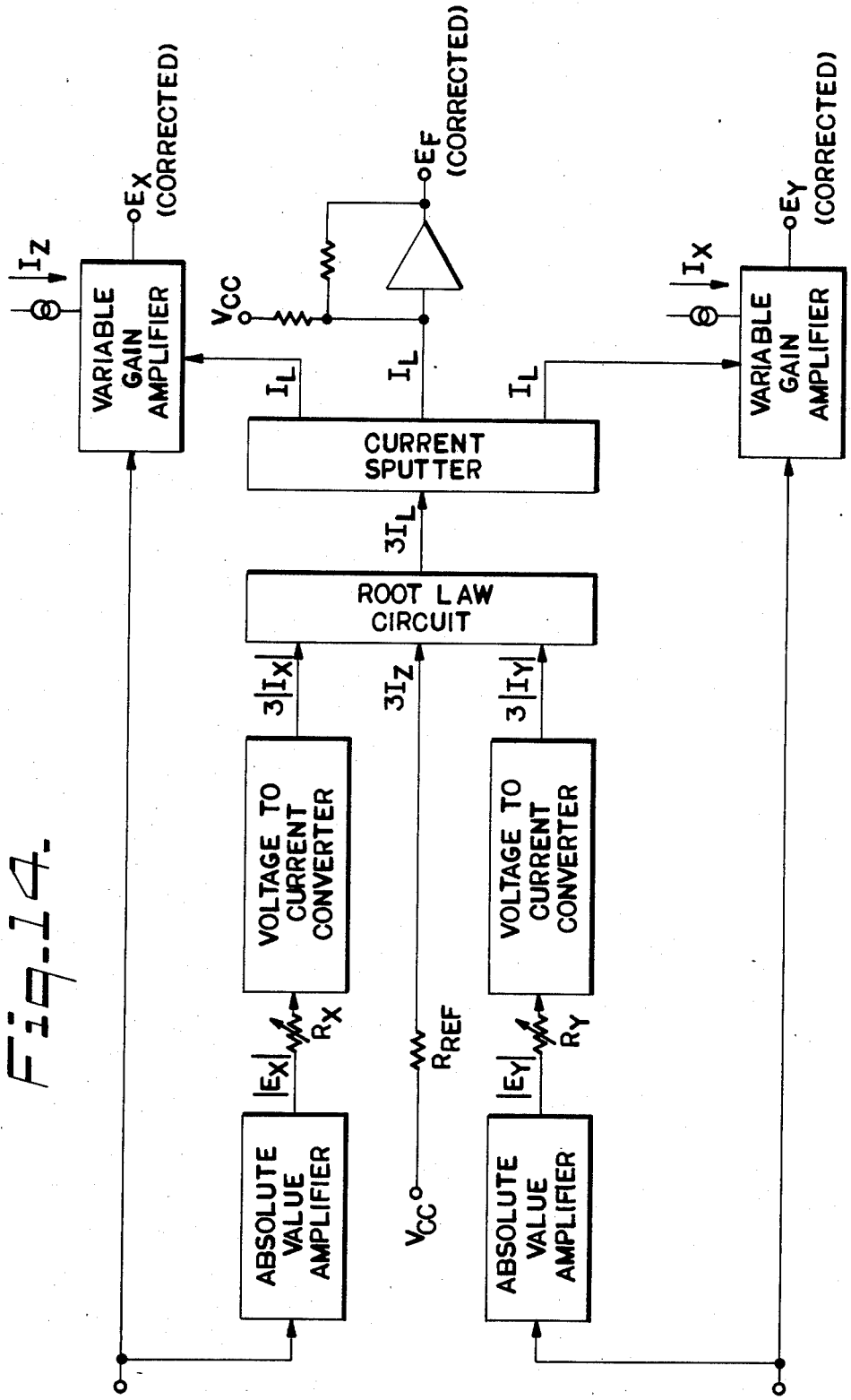
FIG. 14 illustrates a block diagram of the geometry circuit shown in FIGS. 5 and 11.

FIG. 14 illustrates a block diagram of the geometry circuit 32 shown in FIGS. 5 and 11.

Figure 15:
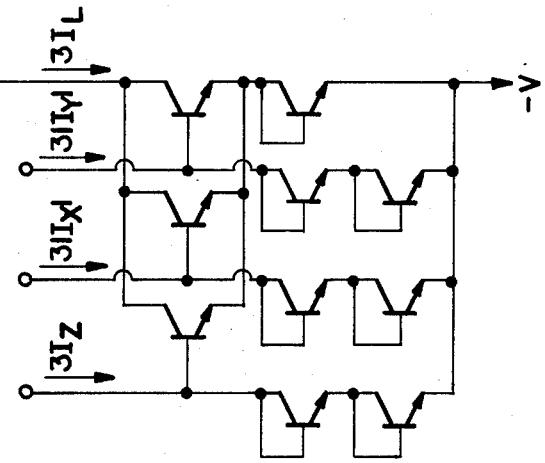
FIG. 15 illustrates a detailed schematic of the root-law circuit portion of the circuit of FIG. 14.

FIG. 15 illustrates a detailed schematic of the root-law circuit portion of the circuit of FIG. 14.

Figure 16:
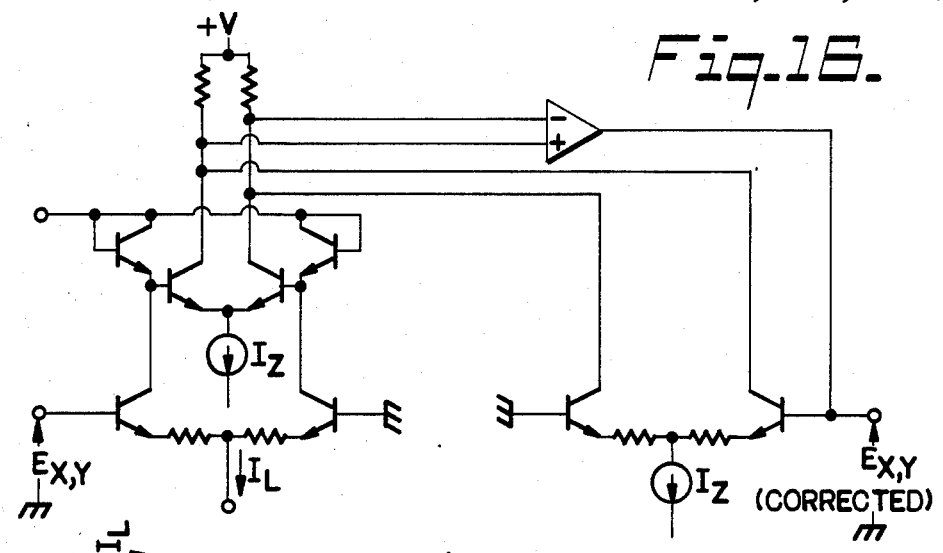
FIG. 16 illustrates a detailed schematic of the variable gain amplifier portion of the circuit of FIG. 14.

FIG. 16 illustrates a detailed schematic of the variable gain amplifier portion of the circuit of FIG. 14.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

What I claim as novel is:

1. An apparatus for correcting video image distortion on a CRT display comprising:
   first means for receiving video information at a first rate and for outputting said video information at a variable rate as a video output signal, said video output signal producing a corrected video image on said CRT display;
   second means for generating a position predictable signal representative of the instantaneous position along an axis of the point of incidence of an electron beam on the face of said CRT display; and
   third means for generating a variable rate clock signal as a function of the position predictable signal, said variable rate clock signal being input to said first means to produce said video output signal.

2. An apparatus as recited in claim 1, wherein the first means are responsive to a video input signal having a succession of active scanning intervals, during which the video input signal bears picture information, and wherein said first means comprise first and second storage devices, first switch means for connecting a signal input terminal of said first means selectively to the first storage device and the second storage device during alternate active scanning intervals, and second switch means for connecting the second storage device and the first storage device selectively to a signal output terminal of said first means during alternate active scanning intervals.

3. An apparatus as recited in claim 2, wherein the first means have a control terminal connected to receive the variable rate clock signal and also have a clock input terminal, said signal input terminal and said clock input terminal being respectively connected to the first switch means and the signal output terminal and the control terminal being connected to the second switch means, each of said first and second storage devices being a shift device and having an input terminal, an output terminal and a clock terminal and being responsive to clock pulses received at the clock terminal to shift information received by way of the input terminal towards the output terminal, said first switch means being operative to connect the signal input terminal of the first means alternately to the input terminal of the first storage device and the input terminal of the second storage device and also being operative to connect the clock input terminal of the first means alternately to the clock terminal of the first storage device and the clock terminal of the second storage device, and the second switch means being operative to connect the signal output terminal of the first means alternately to the output terminal of the second storage device and the output terminal of the first storage device and also being operative to connect the control terminal alternately to the clock terminal of the second storage device and the clock terminal of the first storage device.

4. An apparatus for correcting video image distortion on a CRT display comprising:
   means for receiving video information at a first rate and for outputting said video information at a variable rate as a video output signal, said video output signal producing a corrected video image on said CRT display;
   means for generating a position predictable signal representative of the instantaneous position along a first axis of the point of incidence of an electron beam on the face of said CRT display; and
   means for generating a variable rate clock signal as a function of the position predictable signal, said generating means including:
   means for receiving the position predictable signal;
   means for generating a positional error signal for said electron beam from said position predictable signal;
   means for generating a velocity error signal for said electron beam from said positional error signal; and
   means for generating said variable rate clock signal from said velocity error signal, said variable rate clock signal being input to said receiving and outputting means to produce said video signal.

5. An apparatus as recited in claim 4 wherein said variable rate clock signal generating means further comprises means for generating a corrected deflection signal from a ramp signal, said corrected deflection signal being applied to said electron beam along a second axis orthogonal to said first axis.

6. An apparatus as recited in claim 4 wherein said position predictable signal generating means further comprises means for generating from said position predictable signal a non-linear input signal for input to said position predictable signal generating means together with a linear deflection signal applied along said first axis.

7. An apparatus as recited in claim 4, wherein said receiving and outputting means has an input terminal at which video information is received as a succession of raster lines at a first clock rate, first and second storage means, first switch means connected between the input terminal and the first and second storage means for directing successive raster lines to the first and second storage means in alternating fashion, an output terminal, and second switch means for applying the variable rate clock signal to the second storage means and the first storage means in alternating fashion at line rate and for synchronously connecting the output terminal to the second storage means and the first storage means.

8. Display apparatus comprising:
   a raster scan display device having a display surface, means for generating a light dot on the display surface, means for causing the light dot to scan over the display surface along two mutually perpendicular axes, and means for varying the intensity of the light dot in response to a video signal, and
   correction means for at least partially preventing geometrical distortion of an image generated by the display device in response to a video input signal, said correction means comprising
   first means having a signal input terminal for receiving the video input signal, a signal output terminal and a control terminal, said first means being responsive to the video input signal for temporarily storing picture information representative of the distribution of optical energy over a scene, and being responsive to a control signal applied to its control terminal to generate a video output signal from the stored information and to make the video output signal available at its signal output terminal, the signal output terminal being connected to the raster scan display device for applying the video output signal to the means for varying the intensity of the light dot on the display surface,
   second means connected to the means for causing the light dot to scan over the display surface for generating a position predictable signal that is representative of the position of the light dot along a first of said axes, and
   third means connected to receive the position predictable signal and also connected to the control terminal of the first means for causing said first means to generate said video output signal at a variable data rate that is dependent on the position predictable signal.

9. Apparatus according to claim 8, wherein the first means are responsive to a video input signal having a succession of active scanning intervals, during which the video input signal bears picture information, and wherein said first means comprise first and second storage devices, first switch means for connecting the signal input terminal selectively to the first storage device and the second storage device during alternate active scanning intervals, and second switch means for connecting the second storage device and the first storage device selectively to the signal output terminal during alternate active scanning intervals.

10. Apparatus according to claim 8, wherein said first means comprise shift means responsive to clock pulses received at said control terminal for shifting information received by way of the signal input terminal towards the signal output terminal, and wherein said third means comprise means responsive to said position predictable signal for producing a rate signal representative of the rate at which the light dot is deflected along said first axis, and means responsive to said rate signal for developing said control signal, said control signal being a clock pulse signal having a repetition frequency which is a function of said rate signal.

11. Apparatus according to claim 8, wherein the first means comprise first shift means, second shift means, first switch means and second switch means, and also have a clock input terminal, said signal input terminal and said clock input terminal being connected to the first switch means and the signal output terminal and the control terminal being connected to the second switch means, each of said first and second shift means having an input terminal, an output terminal and a clock terminal and being responsive to clock pulses received at the clock terminal to shift information received by way of the input terminal towards the output terminal, said first switch means being operative to connect the signal input terminal of the first means alternately to the input terminal of the first shift means and the input terminal of the second shift means and also being operative to connect the clock input terminal of the first means alternately to the clock terminal of the first shift means and the clock terminal of the second shift means, and the second switch means being operative to connect the signal output terminal of the first means alternately to the output terminal of the second shift means and the output terminal of the first shift means and also being operative to connect the control terminal alternately to the clock terminal of the second shift means and the clock terminal of the first shift means.

12. Apparatus according to claim 8, wherein the raster scan display device is a cathode ray tube having a curved display surface, the means for generating the light dot being an electron gun for generating a beam of electrons directed towards the display surface along an axis of the cathode ray tube, and the means for causing the light dot to scan being operative to deflect the electron beam from the axis of the cathode ray tube about a point of deflection that is spaced from the center of curvature of the display surface, and wherein the third means are operative to cause the first means to generate the video output signal at a data rate that increases as the angle of deflection of the electron beam increases.

13. A circuit for generating variable rate clock pulses in response to first and second signals, said first signal being a position predictable signal representative of the instantaneous position along a predetermined axis of the point of incidence of the electron beam of a cathode ray tube on the faceplate of the cathode ray tube and said second signal being representative of the desired position of said point of incidence along said axis, said circuit comprising:
first means for forming a difference signal representative of the difference between the first signal and the second signal,
second means for forming a rate signal representative of the first derivative with respect to time of the difference signal, and
means responsive to the rate signal for developing a clock signal having a pulse repetition rate that is dependent upon the rate signal.

14. An apparatus for receiving an input video signal representative of a video image and modifying the input video signal so that the video image can be displayed in substantially undistorted form on a raster scan cathode-ray tube display device that comprises a cathode ray tube having a display surface, means for generating an electron beam that is incident on the display surface and means for deflecting the electron beam so that the point of incidence of the electron beam is scanned over the display surface along first and second mutually perpendicular scanning axes at first and second scanning frequencies respectively, the second scanning frequency being higher than the first scanning frequency whereby a raster pattern is formed, said apparatus comprising:
first means for receiving samples of the input video signal at a first data rate and having an output terminal at which said samples are provided at a variable data rate in response to variable rate pulses for application to the cathode ray tube display device for generating the video image thereon; and
second means for generating said variable rate pulses, said second means including means for developing a position predictable signal representative of the instantaneous scan position of the point of incidence of the electron beam along the second scanning axis, means responsive to said position predictable signal for differentiating said position predictable signal and thereby providing a rate signal representative of the rate at which the point of incidence is scanned along the second axis, and means responsive to the rate signal for developing a train of pulses at a frequency which is a function of the rate signal, the pulses of said train being the variable rate pulses.

15. An apparatus according to claim 14, wherein the means for developing the position predictable signal comprise an operational amplifier for receiving a signal representative of the deflection of the electron beam and a geometry circuit connected to the output of the operational amplifier and to the input thereof for providing feedback thereto, the position predictable signal being developed at the output of the operational amplifier.

16. A method of compensating and correcting for distortion of a video image appearing on a raster scan display, said video image being produced on said raster scan display in response to the generation of video information samples associated respectively with the picture elements of said video image, comprising the steps of:
generating a position predictable signal representative of the instantaneous scan position of said video image along an axis of said raster scan display;
varying the rate at which said video information samples associated with said picture elements are generated, the rate being a function of the instantaneous scan position of the video image as represented by the position predictable signal; and
producing said video image on said raster scan display in response to the video information samples.

17. A method as recited in claim 16, wherein the video information samples occur in a succession of active scanning intervals, corresponding to consecutive scanning lines of the raster scan display, and wherein the step of varying the rate at which said video information samples are generated is accomplished by
(a) writing the video information samples for a first scanning interval into a storage device at a predetermined constant data rate,
(b) writing the video information samples for a second scanning interval into the storage device at said predetermined data rate while concurrently reading the video information samples for the first scanning interval from the storage device at a data rate that is variable independently of said predetermined data rate, and
(c) repeating step (b) for succeeding scanning intervals.

* * * * *